United States Patent [19]

Masters et al.

[11] Patent Number: 4,671,345

[45] Date of Patent: Jun. 9, 1987

[54] REGENERATIVE HEATING SYSTEMS

[75] Inventors: Jeffery Masters; Roger J. Webb, both of Solihull, England

[73] Assignee: British Gas Corporation, London, England

[21] Appl. No.: 817,451

[22] Filed: Jan. 9, 1986

[30] Foreign Application Priority Data

Feb. 4, 1985 [GB] United Kingdom ................. 8502759

[51] Int. Cl.⁴ .............................................. F28D 17/04
[52] U.S. Cl. ..................................... 165/9.3; 165/9.4; 432/182
[58] Field of Search .................. 165/9.3, 9.4; 432/180, 432/181, 182

[56] References Cited

U.S. PATENT DOCUMENTS

| 559,940 | 5/1896 | Gantt | 165/9.4 |
| 2,768,822 | 10/1956 | Frey | 165/9.3 |
| 3,009,690 | 11/1961 | Brichard | 432/180 |
| 3,376,115 | 4/1968 | Kraft et al. | 165/9.3 |

FOREIGN PATENT DOCUMENTS 107244  5/1984  European Pat. Off. ............. 165/9.3

Primary Examiner—Albert W. Davis, Jr.
Attorney, Agent, or Firm—Oblon, Fisher, Spivak, McClelland & Maier

[57] ABSTRACT

A regenerative heating system comprises two heat regenerators 1 and 2 of the type which are operable so that while one is being heated by waste gas the other is heating air for the combustion of fuel. The regenerators 1 and 2 communicate with each other adjacent one end to form a chamber 11 into which fuel gas is injected by means of a fuel pipe 3. The waste gas enters its respective regenerator by way of end 8 and passes through the bed 5 of the regenerator which stores the heat. Air travelling in the opposite direction is heated in the bed 5 and entrains the fuel gas. The steps 12 provide a venturi or choke effect on the air causing the pressure in the regenerator heating air to be lower than that in the regenerator being heated by waste gas. Fuel gas is thereby drawn into the air stream for admixture therewith and ignition for combustion by means of a pilot light 14.

3 Claims, 5 Drawing Figures

REGENERATIVE HEATING SYSTEMS

The present invention relates to a regenerative heating system comprising two heat regenerators of the type which are operable so that while one is being heated by waste gas the other is heating air for the combustion of fuel.

According to the present invention we provide a regenerative heating system comprising two heat regenerators of the type which are operable so that while one is being heated by waste gas the other is heating air for the combustion of fuel, the regenerators communicating with each other adjacent one end to form a chamber provided with an inlet for the injection of fuel into the chamber, the other end of each regenerator serving as an inlet for the introduction of the air into each regenerator and the regenerators being adapted to maintain a pressure differential between the two regenerators such that the pressure in the regenerator heating the air is lower than the pressure in the regenerator being heated by the waste gas so that the fuel is caused to be drawn from the chamber into the regenerator heating the air for admixture with the air for combustion.

By adopting this arrangement, it is only necessary to have one fuel supply to serve both regenerators whereas with the conventional systems each regenerator needs its own fuel supply. Similarly there is only need for one pilot light to ignite the fuel.

The pressure differential between the two regenerators may be created by providing means within each regenerator adapted to affect the aerodynamic flow characteristics of the air and the waste gas for this purpose.

Embodiments of the invention will now be particularly described with reference to the accompanying drawings in which.

Figure 1:
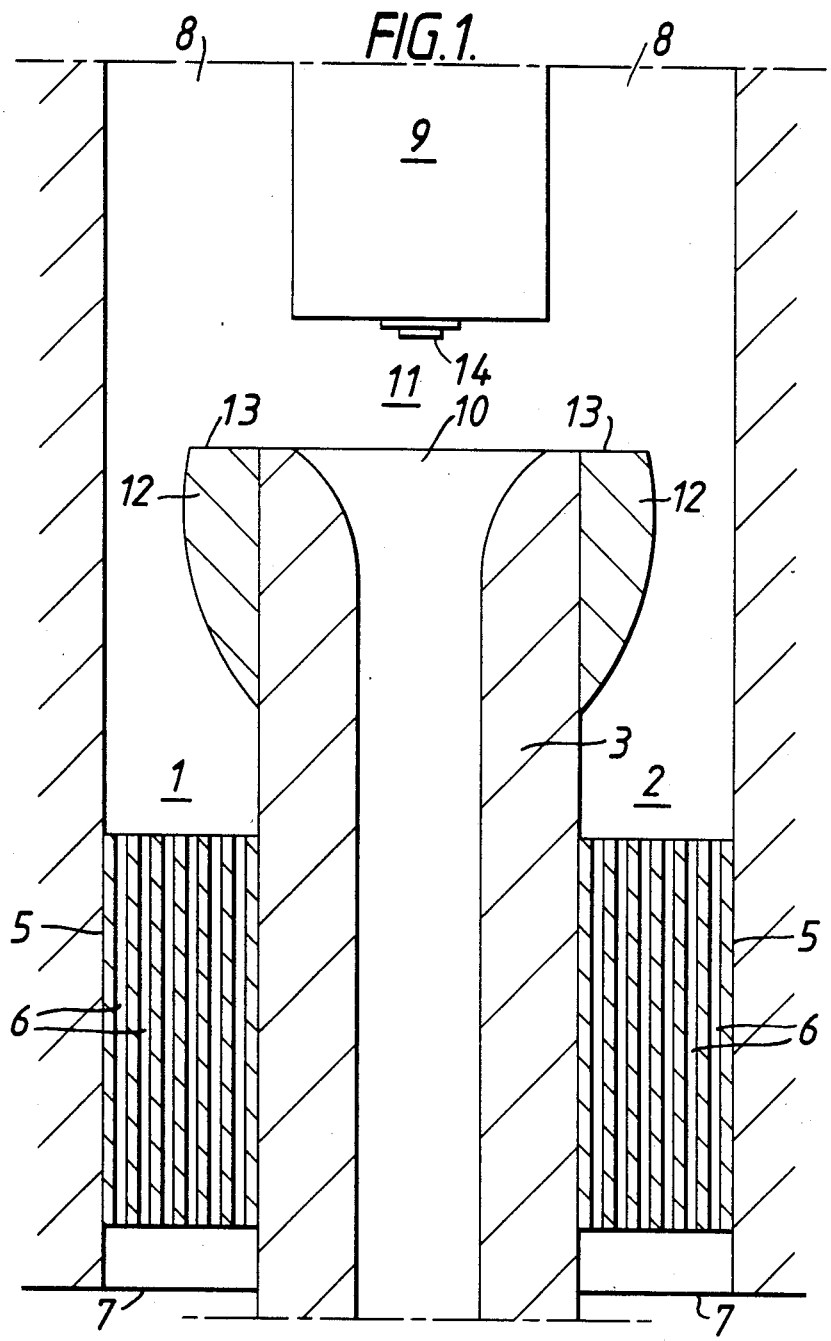
FIG. 1 is a longitudinal sectional view of one form regenerative heating system.
Figure 2:
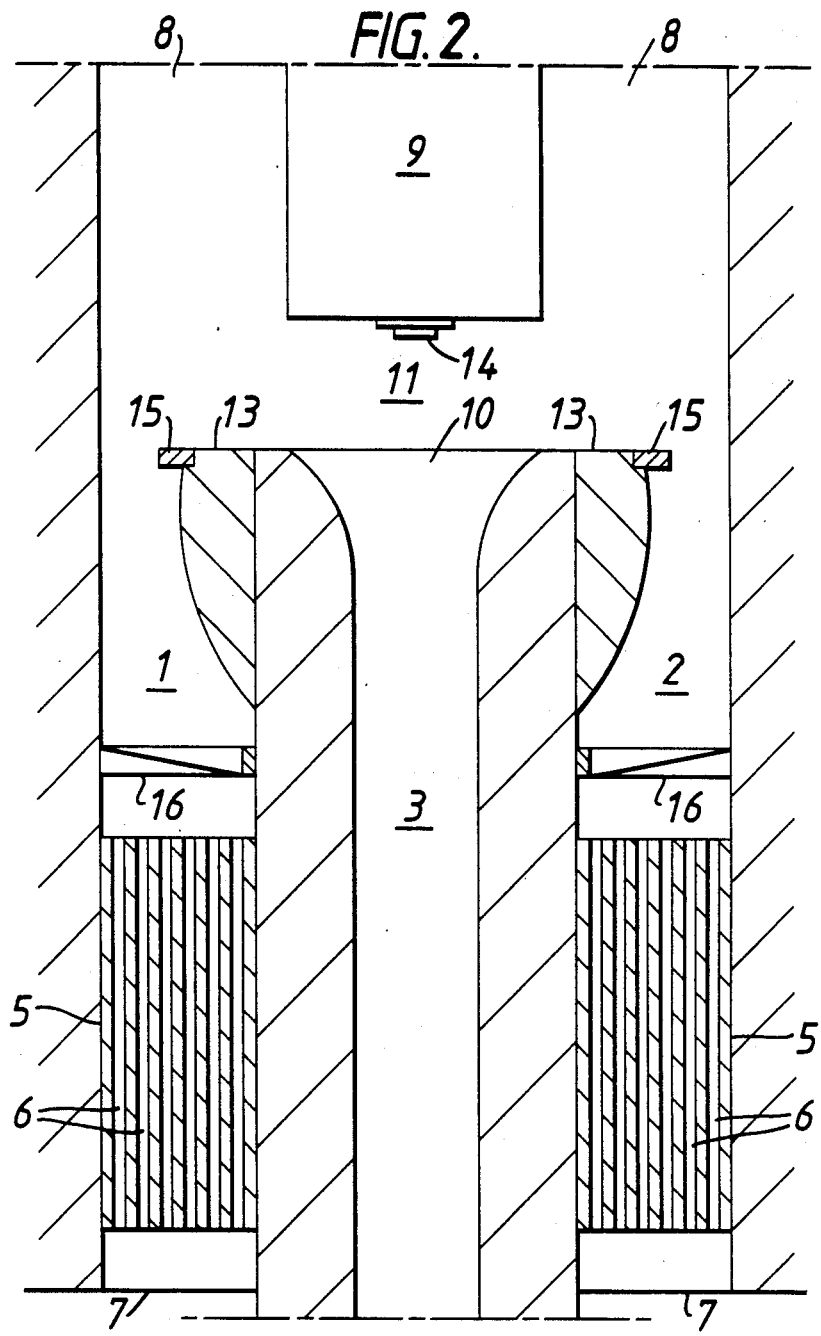
FIG. 2 is a longitudinal sectional view of another form of the system.
Figure 3:
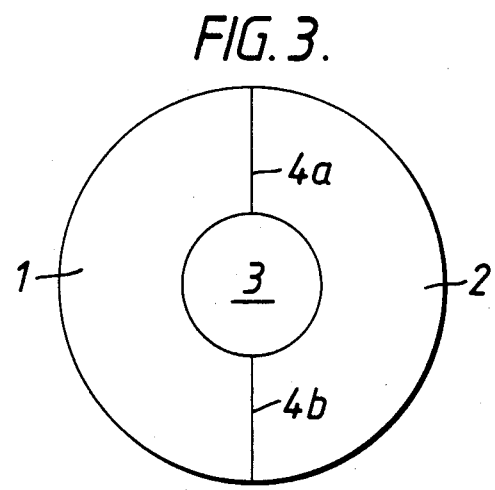
FIG. 3 is a cross-section of the system shown in FIGS. 1 and 2.

In the systems shown in FIGS. 1 to 3 identical parts bear identical reference numerals. The system comprise a pair of regenerators in the form of semi-circular shafts 1 and 2 through the centre of which extends a fuel 3 pipe supplying natural gas.

The semi-circular walls of the regenerators 1 and 2 are of a refractory material. The regenerators are separated by a dividing wall 4 also of refractory and by the fuel pipe 3 which is also of refractory and adjoins the two portions 4a, 4b of the wall 4 along a lower part of the length of the wall.

As is conventional, each regenerator contains a bed 5 of heat absorbent material having channels 6 through which waste gas passes in one direction and air in the opposite direction, the bed absorbing heat in the first case and releasing it to the air in the second case.

The air to be heated enters each regenerator from the end 7 of each regenerator. This end 7 also serves as the outlet end for waste gas.

The combusted fuel gas leaves each regenerator by way of the other end 8 and this end 8 also serves as the inlet end for waste gas.

The top part 9 of the wall 4 extends across the outlet end 10 of the pipe 3 but is spaced therefrom to leave a space forming a communicating chamber 11 between the regenerators 1 and 2.

The upper end of the pipe 3 is provided with a pair of part-circular steps 12, one for each regenerator, these steps 12 being secured to the uppermost end of the fuel pipe 3. The steps 12 are shaped so as to provide in the direction of air flow a gradually reducing throat area. This serves to provide a venturi or choke effect which tends to accelerate the heated air emerging from the bed 5 and leads to a low pressure area in this region. This causes any fuel gas which may be entering the chamber 11 to be entrained into the region to mix with the air for combustion. The flat face 13 of the step 12 is impinged upon by waste gas flowing in the opposite direction and this gives rise to a high pressure region to act as a gas seal. Thus when one regenerator is heating air and the other is being heated by waste gas, the overall result is that fuel gas is preferentially drawn from the chamber into the air stream.

A pilot burner 14 may be mounted on the wall portion 9 at or near the mouth of the fuel pipe 3, the pilot flame being drawn into the appropriate regenerator by the flow aerodynamics.

The ends 7 of the regenerators may be connected to a compressor for the supply of air and to a waste-gas exhaust eductor or fan by way of a reversing valve so that the regenerators can alternate between air heating and waste-gas heating cycles. This arrangement is, of course, quite conventional.

Referring to FIG. 2 a part-circular collar 15 secured to each step 12 flush with the flat face 13 serves as a turbulance promoter to provide better mixing of the fuel gas and air to facilitate combustion. The collar 15 however also provides a higher pressure on the face 13.

Part-circular ceramic deflector vanes 16 may be located within each regenerator for diverting the air flow towards the outer surface of the regenerators thereby to provide a still lower pressure in the regenerator. During the waste-gas heating cycle these vanes have little effect on flow aerodynamics.

Figure 4:
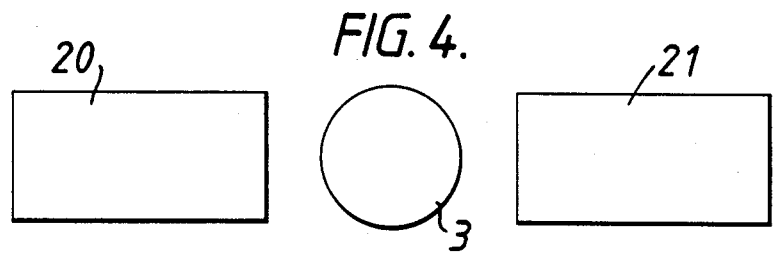
FIG. 4 is a cross-section view of another arrangement of the system.
Figure 5:
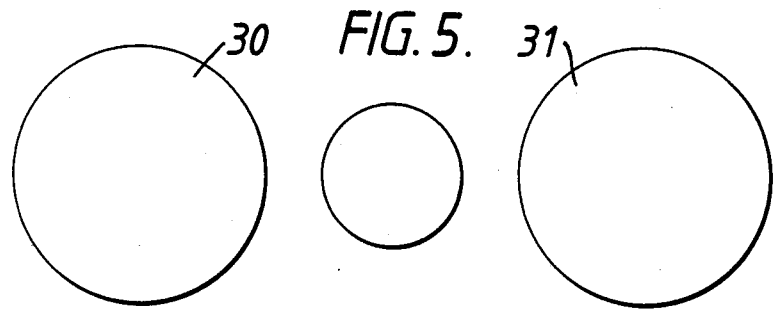
FIG. 5 is a plan view of yet another arrangement of the system.

Referring to FIG. 4 in this case the regenerators 20 and 21 are rectangular in cross-section while in FIG. 5 the regenerators 30 and 31 and circular in cross-section.

The advantage of the arrangement shown in FIGS. 1 to 3 is that the whole assembly can be fitted into a tube.

Furthermore since the fuel is supplied continously to one point in the chamber, the need for a fuel reversal mechanism such as a reversing valve to reverse the fuel flow continuously from one regenerator to another as is the case with conventional regenerative systems is obviated. The need for fuel reversal is in conventional regenerative systems a major limitation on the frequency with which the regenerators can reverse their roles. It is possible with the present arrangement to reverse at higher frequencies than is possible with conventional systems and as a consequence the overall dimensions of the unit can be reduced leading to significant cost benefits.

The high preheats attained with regenerative heat recovery systems result in exhaust gases which are high in levels of the oxides of nitrogen (NOx). These are undesirable combustion products and it is the practice to reduce them by recycling flue gas into the fuel gas before it is combusted. In a conventional regenerative system this involves the use of extra external components adding to the expense of the system. However, in the present arrangement such recycling takes place automatically in the combustion chamber.

We claim:

1. A regenerative heating system comprising two heat regenerators of the type having a bed of heat absorbing material and which are operable so that while one is being heated by waste gas the other is heating air for the combustion of a gaseous fuel, each regenerator having a first end serving either as an inlet for waste gas or as an outlet for combusted fuel and a second opposite end serving either as an outlet for waste gas or as an inlet for air, a common chamber lying between said first end of each regenerator and said bed and through which in use air and waste gas flow in opposite directions by way of their respective regenerators, means being provided to inject gaseous fuel into the chamber and each regenerator being provided internally with means serving in use to promote a pressure differential between the regenerators such that the pressure in the regenerator through which the air is passing is lower than the pressure in the regenerator through which the waste gas is passing so that the fuel is caused to be drawn from the chamber towards the air for admixture therewith for subsequent combustion.

2. A system as claimed in claim 1 in which the means serving in use to promote a pressure differential between the regenerators is adapted to affect the aerodynamic flow characteristics of the air and waste gas.

3. A system as claimed in claim 2 in which the means serving in use to promote a pressure differential between the regenerators comprise means, in each said regenerator, for defining a venturi for air passing therethrough and for defining a flat surface upon which waste gas impinges.

* * * * *